United States Patent Office 3,317,648
Patented May 2, 1967

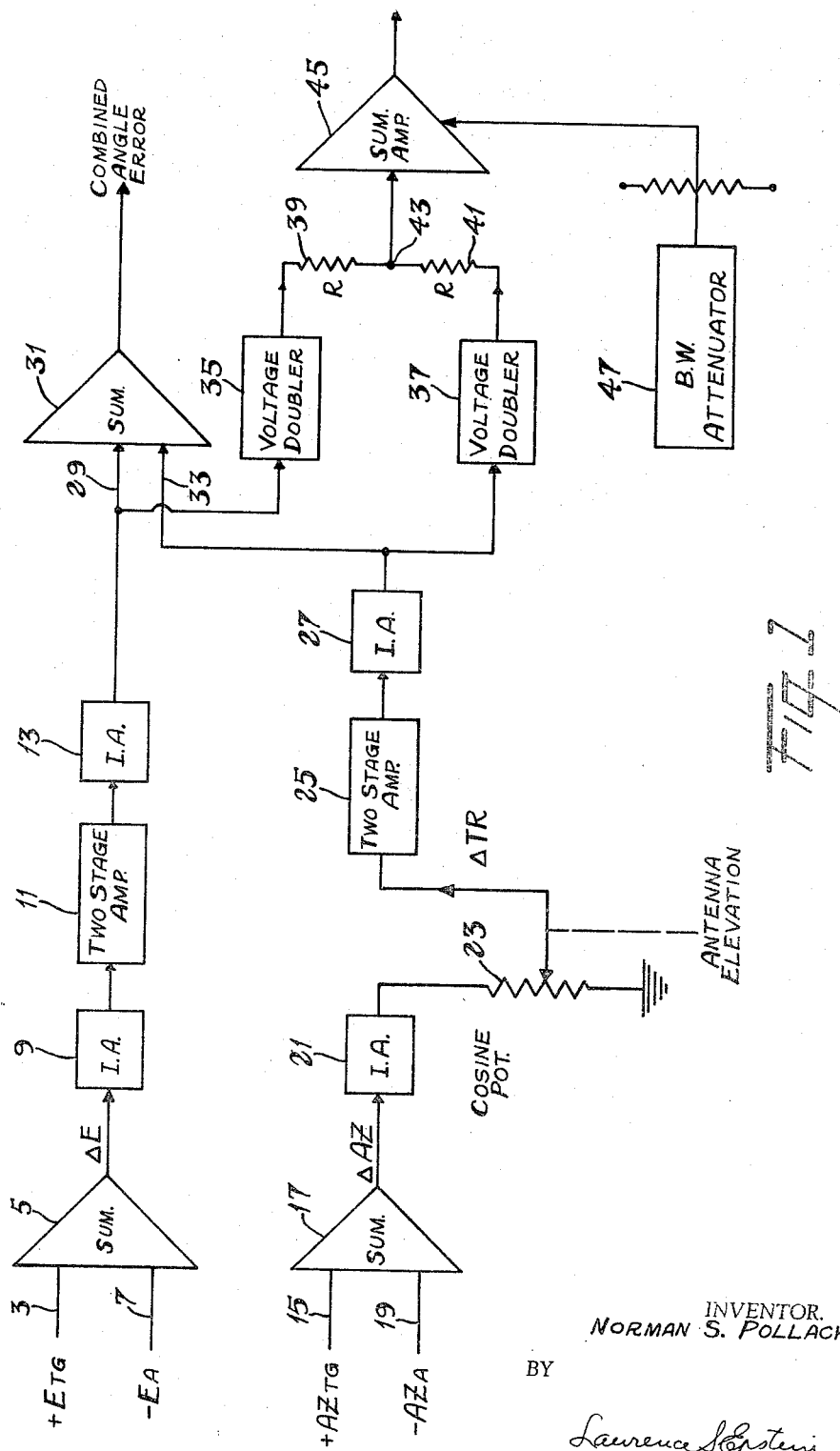

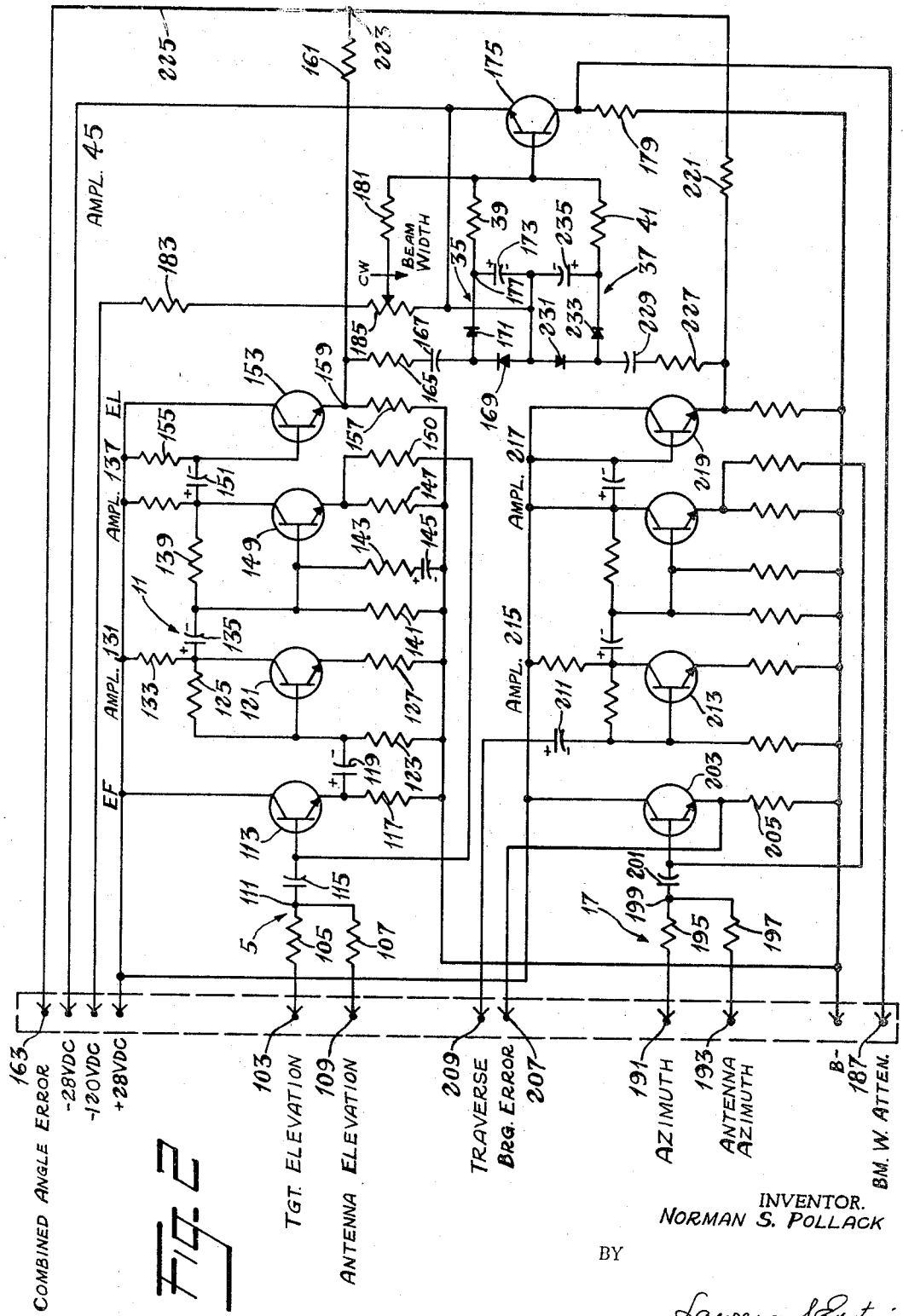

3,317,648
TRANSISTORIZED ANGLE ERROR GENERATOR
Norman S. Pollack, Commack, N.Y., assignor, by mesne assignments, to the United States of America as represented by the Secretary of the Navy
Filed Sept. 22, 1965, Ser. No. 489,444
7 Claims. (Cl. 35—10.4)

This device relates to radar simulations, and more particularly to realistic simulation of the attenuation of a received radar beam pulse generated by an operational radar of the tracking or fire control type.

In order to properly simulate radar devices it is necessary to realistically simulate the attenuation resulting from the propagation of a radar pulse by an operational radar. This attenuation is caused by antenna beam pattern, and atmospheric anomalies. Such attenuation varies as a function of the square root of the sum of each of the squares of the angular position, in traverse and azimuth, of a simulated radar's antenna.

Therefore, one of the objects of the present invention is to provide a device which simulates more realistically the attenuation of a radar target. A further object of the invention is to provide a device which realistically simulates an error signal proportional to the lack of correspondence between the simulated radar's antenna and the simulated target position. Thus, the usage of the invention is to produce such an error signal in the environment of a radar simulator for the purposes of training personnel in the operation of actual equipment.

Previously, traverse and elevation angle errors have been computed by utilizing a mechanical differential coupled with servo mechanism comparator units. Such mechanical comparators required mechanical inputs of target elevation and antenna elevation. These inputs were then summed algebraically to develop an error angle. This resultant error angle was then converted to an electrical error signal by the use of a potentiometer on a differential output shaft. The subject invention, however, replaces the mechanical comparator and performs the same function in a better manner and without any of the complex differential gearings and of course, a reduction in size and necessary power requirements; and further results in greater reliability in addition to greater accuracy of angle error generation.

Therefore, it is another object of this invention to provide an improved angle error generator.

Still another object of the present invention is to provide a transistor device which more accurately provides angle error indications.

As another object the invention aims to accomplish the foregoing through the provision of an electrical circuit for providing an electrical signal whose amplitude is approximately proportional to the square root of the sum of a first electrical input signal squared and a second electrical input signal squared, comprising a first voltage doubler means having a first output, a first transmission means for coupling said first electrical input signal to said first voltage doubler means, a second voltage doubler means having an output, a second transmission means for coupling said second electrical input signal to said second voltage doubler means, resistive output means coupled to said voltage doubler means, and amplifier means connected to said resistive output means for drawing input current therefrom at a voltage corresponding to said electrical signal.

Other objects and many of the attendant advantages of this invention will be readily appreciated as the same becomes better understood by reference to the following detailed description when considered in connection with the accompanying drawings wherein:

FIG. 1 is a drawing, partly schematic and partly functional of the present invention; and
FIG. 2 is a detailed schematic of the present invention.
Similar reference numerals refer to the same elements in both figures.

Referring now to FIG. 1, the present invention basically comprises two channels, an elevation channel and an azimuth channel. An electrical signal (A.C.) proportional in amplitude to the elevation angle of a simulated target is fed to input 3, of a summing means 5. The other input 7 has applied to it an electrical signal of opposite phase which is proportional in amplitude to the elevation angle of a simulated antenna. These elevation input signals, as well as subsequently described azimuth signals, may be obtained from conventional devices, such as target course generators and other conventional computers. The resulting output from the summing means 5 is an electrical signal proportional in amplitude to the difference between the magnitudes of the two input signals coupled thereto. This output signal is referred to in FIG. 1 as $\Delta E$, the elevation error angle. This signal is then coupled to the input of an isolation amplifier 9 whose output is subsequently coupled to the input of a two-stage amplifier 11 wherein said signal is amplified. It is then fed to a final isolation amplifier 13.

In a similar manner an output signal proportional to the traverse angle error, referred to as $\Delta TR$ is generated in the azimuth channel. A first A.C. electrical signal proportional in amplitude to the azimuth angle of a target is coupled to one input 15 of a summing means 17. A second input signal, of opposite phase, and proportional in amplitude to the azimuth angle of the antenna, referred to as $AZ_A$, is coupled to the second input 19 of the summing device 17. The resultant output signal from said summing device 17 is therefore proportional in magnitude to the azimuth angle error between the target and the antenna directed toward it. Said azimuth error signal is referred to as $\Delta AZ$ and is then coupled to an isolation amplifier 21, whose output is coupled to a cosine potentiometer 23, which converts the azimuth error signal into a traverse angle error signal referred to as $\Delta TR$. Coupled to the arm of said cosine potentiometer 23 is a mechanical output positional "signal" proportional to the angular position, in elevation, of the simulated antenna (not shown), as will be described in more detail infra. Such "signal" can be supplied from conventional devices well known in the art. Said traverse angle error signal is then coupled to the input of a two-stage amplifier 25 wherein it is amplified and then coupled to the input of an isolation amplifier 27. The elevation angle error signal from the output of the isolation amplifier 13 of the elevation channel, is coupled to one input 29 of summing means 31. The other input 33 of said summing means 31 has coupled to it, from isolation amplifier 27, an electrical signal proportional to the traverse angle error. The resulting output from said summing means 31 is then the combined angle error.

Each of the aforementioned signals, the elevation angle error and the traverse angle error from the two isolation amplifiers 13 and 27, are also coupled, respectively, to the inputs of two voltage doublers 35 and 37. Each of these signals are doubled, rectified, and filtered in the voltage doublers 35 and 37, thereby providing at the output of each voltage doubler, a D.C. voltage whose magnitude is proportional to either the elevation angle error or the traverse angle error. Said signals from the outputs of the voltage doublers are then coupled to two ends of resistors 39 and 41 which have their other ends coupled together at junction 43. At junction 43, there is an electrical signal whose magnitude is proportional to a rough approximation of the square root of the sums of the squares of the two input signals applied at the inputs of voltage doublers 35 and 37. Such signal is then coupled to a summing amplifier 45 and hence to an output means (not shown). Also provided is a means for varying the attenuation of the beam width, element 47. Such means provides realistic simulation of the beam's attenuation.

The fact that the signal at junction 43 is a rough approximation of the square root of the sum of the squares of the two input signals to the voltage doublers 35 and 37 may be explained as follows. Assuming an input signal of 5 volts to the voltage doubler 35 and say 7 volts to the doubler 37, the D.C. output of doubler 35 would be about 10 volts, positive, and that of doubler 37 about 14 volts, positive. Because amplifier 45 (explained more fully hereinafter) draws some input signal current, there will be some IR drop across each of resistors 39 and 41. These resistors are selected to produce IR drops which will result in the desired approximation. Thus, if in the present example the resistors each have an ohmic value of 100K and the amplifier 45 draws no current from junction 43, the potential at the junction would be 12 volts. Inasmuch as the amplifier 45 does draw some current, say 60 microamperes, the voltage at junction 43 will obviously drop to about 9 volts, a rough approximation of the square root of the sum of the squares of the inputs to the voltage doublers.

Now, if the inputs to the doublers 35 and 37 were say 10 and 7 volts, respectively, the outputs thereof would be 20 and 14 volts. If the amplifier 45 draws no current the junction 43 would be at a potential of 17 volts. The amplifier does, however, draw current and the higher voltages involved would dictate a somewhat higher rate, say 80 microamperes, which would result in dropping the voltage at junction 43 to about 13 volts, again an approximation of the square root of the sum of the squares of the input voltages to the doublers.

Referring now specifically to FIG. 2 wherein is shown a detailed schematic of the circuit of FIG. 1, an A.C. signal, of positive phase, which is proportional in amplitude to the elevation angle, of a simulated target, is coupled via terminal 103 to one input of the summing means 5 which comprise resistors 105 and 107. An A.C. signal, of negative phase, whose amplitude is proportional to the elevation angle of the simulated antenna, is coupled to the other input 109 of said summing means 5. The resulting voltage at junction 111, the output of the summing means 5, is then proportional to the difference between the target elevation angle and the antenna elevation angle. This then is the elevation angle error signal. This elevation error signal is then coupled to the base of transistor 113 through capacitor 115. Transistor 113 is used in the common collector configuration to present a high input impedance to the error junction 111. This signal passes through the base of transistor 113 to the emitter, the phase remaining the same, and is present across emitter load 117. This signal is then coupled through capacitor 119 to transistor 121 of the first amplifier 131 of the two-stage amplifier 11. Resistors 123 and 125 are used therein as voltage dividers thereby establishing the operating point of transistor 121. Such method of biasing is used to provide temperature stability. Resistor 127 provides added stability to said amplifier 121. The signal passes from the base of 121 to the collector and is present across collector load resistor 133. At the collector this signal is amplified and inverted from the base. This signal then flows through coupling capacitor 135 to the base of transistor 149 of the second amplifier 137. Resistors 139 and 141 provide a voltage divider bias network establishing the operating point of transistor 149. Additionally, resistor 143 and capacitor 145 are connected from base to B negative of the power supply thereby providing a phase-sensitive network which insures that the signal will have only a 180 phase shift from base to collector thereof. Emitter resistor 147 is used both for temperature stability and as a dropping resistor for a feedback voltage from transistor 149 to transistor 113. The signal present at the emitter of transistor 149 is fed back through attenuating resistor 150. This feedback insures increased overall temperature stability. The signal at the collector of transistor 149 is fed through coupling capacitor 151 to the base of transistor 153. Transistor 153 is connected in the common collector configuration thereby providing a high input impedance to preceding amplifier 137. Resistors 155 and 157 provide the necessary bias for transistor 153. The load resistor of transistor 153 is emitter resistor 157. At junction 159 the output voltage thereof is proportional in amplitude to the elevation angle error. From this terminal the elevation angle error signal is routed to two places; through summing resistor 161 to the final combined angle error output at terminal 163, and also to one input of voltage doubler 35. This signal coupled from the emitter of transistor 153 flows through isolation resistor 165 and coupling capacitor 167 to the voltage doubler 35 which comprises diodes 169, 171, and filter capacitor 173. These two diodes 169 and 171 function as voltage doublers. The capacitor 173 provides a filtering action and together with the two aforementioned diodes 169 and 171, converts the A.C. elevation angle error signal to a D.C. voltage elevation error signal. The negative side of capacitor 173 and the emitter of 175 have a negative 28 volt D.C. supply connected directly to it. This provides the operating point for the voltage doubler 35 and transistor 175. This D.C. signal at the output 177 is coupled through summing resistor 39 to the base of a summing means, in this case, transistor 175 of amplifier 45. This amplifier 45 is operated in the common emitter configuration with resistor 179 acting as a collector load and emitter returned to a negative 28 volt D.C. supply thereby providing the proper transistor action. The base of transistor 175 has three D.C. signal inputs coupled thereto; one from resistor 39, the elevation angle error signal; one from resistor 41 as will be described in more detail infra, the traverse angle error signal; and a signal from resistor 181. Resistor 183 and potentiometer 185 which comprise the beamwidth attenuation circuit 47 are used as a voltage divider from the minus 120 volt D.C. supply to minus 28 volts D.C. The potentiometer 185 varies the negative D.C. voltage fed through summing resistor 181 to the base of 175. This negative D.C. voltage establishes the operating point for transistor amplifier 45 applying the proper level of beamwidth attenuation signal from the collector of 175 to output terminal 187. The output at terminal 187 is a varying D.C. signal representative of the amount of elevation and traverse error present.

The description of the azimuth or traverse channel is substantially the same as the elevation channel described supra. An A.C. signal of positive phase whose magnitude is proportional to the target's azimuth angle is coupled at terminal 191 to the summing means 17. At terminal 193, there is applied an electrical signal whose magnitude is proportional to the antenna's azimuth angle and is of a negative phase of the same frequency. These two signals are then fed through summing resistor 195 and 197, respectively, thereby providing at the junction 199 a resulting signal whose magnitude is proportional to the azimuth angle error. This azimuth error, ΔAZ, represents the lack of correspondence between the simulated target's azimuth angle and the radar antenna's azimuth angle. This azimuth angle error is then fed through coupling capacitor 201 to the base of transistor 203. This transistor 203 is connected in a common collector configuration to present the azimuth error junction 199 with a high input impedance thereby avoiding loading. Resistor 205 is the emitter load resistor for this transistor 203. The signal flows from the emitter of transistor 203, through terminal 207 to a cosine potentiometer 23 (FIG. 1). The arm of this cosine potentiometer 23 is driven by the simulated antenna (not shown) and the position thereof is proportional to the antenna's elevation angle. The output of the cosine potentiometer 23 is the traverse angle error, $\Delta TR$, which is fed back to the azimuth channel and enters at terminal 209 (FIG. 2). The computation that is accomplished by said cosine potentiometer is as follows:

$\Delta TR$ is equal to $\Delta AZ$ times cosine E;
$\Delta TR$ is equal to traverse error;
$\Delta AZ$ equals azimuth error; and
$E$=elevation angle.

At terminal 209 the traverse angle error signal flows through capacitor 211 to the base of transistor 213 of amplifier 215. This transistor amplifier 215 is identical to transistor amplifier 131 described supra. Also, transistor amplifier 217 is identical to amplifier 137, and isolation amplifier (emitter follower) 219 is identical to isolation amplifier (emitter follower) 153. Thus, at the output of transistor 219 there is an electrical signal whose amplitude is proportional to the traverse angle error. This signal is summed through resistor 221 with the elevation angle error signal which is summed through 161 to provide at junction 223 an output signal which is referred to as the combined angle error and then fed over line 225 to output terminal 163. In a similar manner the traverse angle error signal is coupled through resistor 227 and capacitor 229 to the voltage doubler 37 which includes rectifier diodes 231 and 233, and hence to capacitor 235, which provides filtering. The signal that is present at the output of capacitor 235 is then coupled through summing resistor 41 to the base of transistor 175. The output signal at terminal 187 is referred to as the combined attenuation which approximates the following relationship:

$$\Delta \partial = \text{to the square root of } (\Delta TR)^2 + (\Delta E)^2$$

where $\Delta \partial$, combined attenuation;
$\Delta TR$, traverse attenuation;
$\Delta E$, elevation attenuation.

Previous systems resulted in providing a relationship of $\Delta \partial$ which equaled merely the sum of $\Delta TR + \Delta E$ thereby giving an unreleastic simulated beam pattern. This system more closely follows the desired relationship due to the particular arrangement of voltage doubler 35 and 37 and summing resistor 39 and 41, coupled to the base of transistor amplifier 175.

Obviously many modifications and variations of the present invention are possible in the light of the above teachings. It is therefore to be understood that within the scope of the appended claims the invention may be practiced otherwise than as specifically described.

What is claimed is:

1. An electrical circuit for providing an electrical signal whose amplitude is approximately proportional to the square root of the sum of a first electrical input signal squared and a second electrical input signal squared, comprising;
   a first voltage double means, having a first output,
   a first transmission means, for coupling said first electrical input signal to said first voltage doubler means,
   a second voltage doubler means, having an output,
   a second transmission means, for coupling said second electrical input signal to said second voltage doubler means,
   resistive output means, coupled to said voltage doubler means, and
   amplifier means connected to said resistive output means for drawing input current therefrom at a voltage corresponding to said electrical signal.

2. The device as in claim 1 wherein said resistive output means includes two equal value resistor means, each of which is coupled at one end to one output of said voltage doubler means, and coupled together at their other ends.

3. The device as in claim 2 wherein said voltage doubler means includes filter means.

4. The device as in claim 1 wherein each of said voltage doubler means includes rectifier means.

5. A simulator circuit for providing a realistic indication of the attenuation of a radar beam pattern, supplied with electrical signals proportional in amplitude to the elevation and azimuth angle of both a simulated target and a radar antenna, and supplied with a mechanical input proportional to the radar's elevation angle, comprising;
   elevation error summing means, for providing an output signal whose amplitude is proportional to the sum of the target's elevation angle error and the antenna's elevation angle error,
   azimuth error summing means, for providing an output signal whose amplitude is proportional to the sum of the target's azimuth angle error and the antenna's elevation angle error,
   traverse angle error means coupled to the output of said azimuth error summing means, and having as one input thereof a mechanical input proportional to the radar's elevation angle,
   elevation amplifier means coupled to said elevation error summing means having a first electrical output signal,
   traverse amplifier means coupled to said traverse angle error means having a second electrical output signal, and
   electric circuit means for providing an electrical signal whose amplitude is proportional to the square root of the sum of the first electrical output signal squared and the second electrical output signal squared, said electric circuit coupled to said amplifier means.

6. The device as in claim 5 wherein said amplifier means includes isolation amplifier means.

7. The device as in claim 5, in combination with;
   combined error summing means, coupled to said elevation and traverse amplifier means for providing a combined angle error output signal whose amplitude is proportional to the sum of the first and second electrical output signals.

References Cited by the Examiner

UNITED STATES PATENTS 3,089,646   5/1963   Crabb _____ 325—193 X

RODNEY D. BENNETT, *Primary Examiner.*

CHESTER L. JUSTUS, *Examiner.*

T. H. TUBBESING, *Assistant Examiner.*